April 20, 1954  A. T. GORMAN ET AL  2,676,064
FLUID PRESSURE AND DYNAMIC BRAKE INTERLOCK APPARATUS
Filed July 28, 1950  3 Sheets-Sheet 1
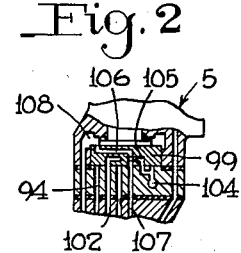
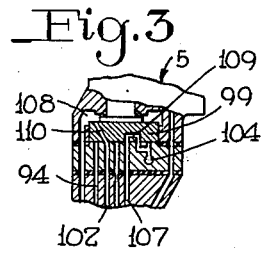
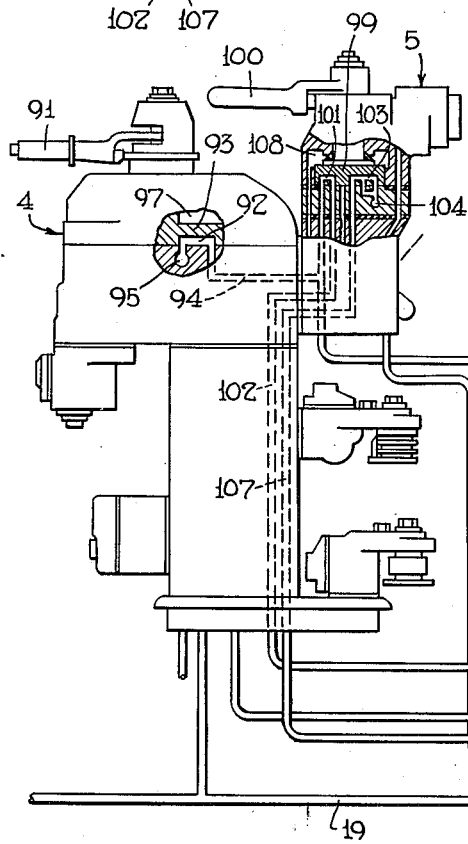
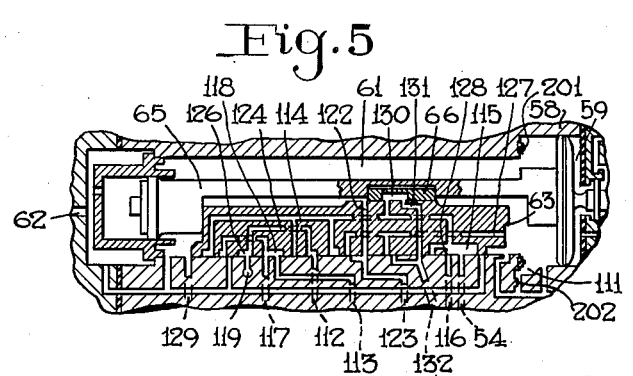
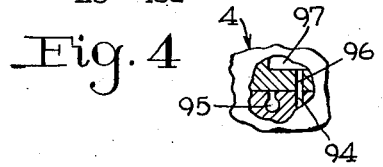
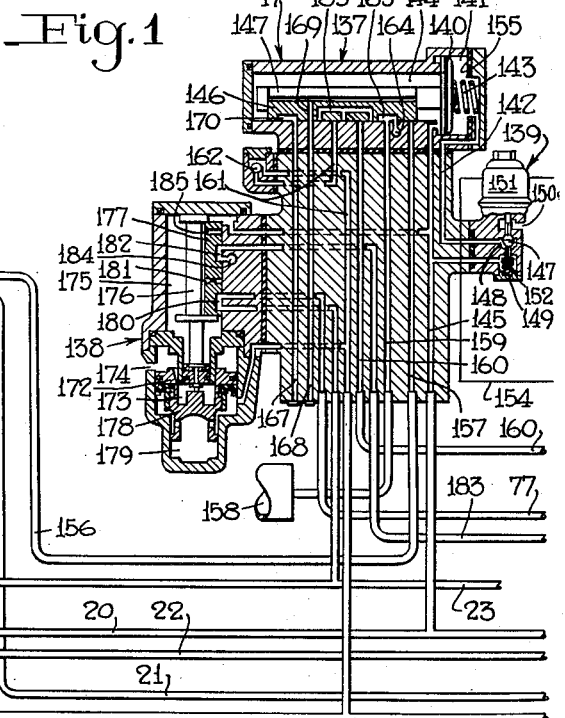
INVENTORS
Andrew T. Gorman
Earle S. Cook
BY
Frank E. Miller.
ATTORNEY

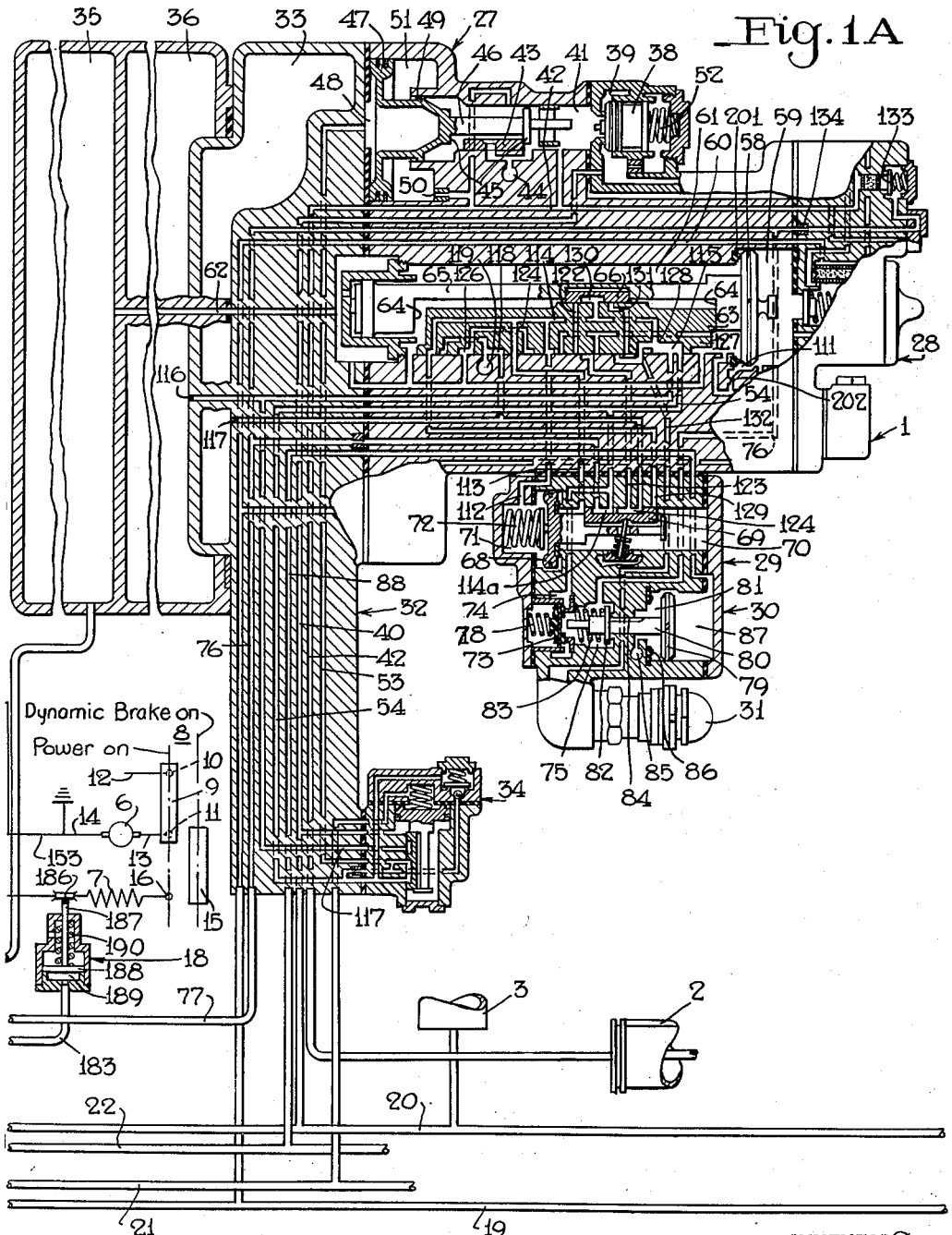

INVENTORS
Andrew T. Gorman
Earle S. Cook
BY
*Frank E. Miller.*
ATTORNEY

Patented Apr. 20, 1954

2,676,064

UNITED STATES PATENT OFFICE 2,676,064

FLUID PRESSURE AND DYNAMIC BRAKE INTERLOCK APPARATUS

Andrew T. Gorman, Pitcairn, and Earle S. Cook, Forest Hills, Pa., assignors to Westinghouse Air Brake Company, a corporation of Pennsylvania Application July 28, 1950, Serial No. 176,404

21 Claims. (Cl. 303—3)

This invention relates to brake apparatus and more particularly to brake apparatus for the use on electrically propelled locomotives.

Certain multiple unit locomotives such as the diesel electric type are equipped with Westinghouse Air Brake Company's No. 8EL locomotive brake equipment for braking the locomotive pneumatically and electric propulsion motors on the locomotive are adapted to operate as generators for supplying electric current to dynamic braking resistors for providing electric braking.

The No. 8EL locomotive brake equipment comprises a distributing valve device and an engineer's brake valve device consisting of an automatic portion and an independent portion. The automatic portion is provided for reducing the pressure of fluid in the usual brake pipe to cause operation of the distributing valve device on the locomotive and of triple valves or the like on cars of a train to effect an automatic application of the fluid pressure brakes thereon, while the independent portion is provided for controlling the fluid pressure brakes on the locomotive independently of those on the cars of the train. If both the fluid pressure brakes and electric brakes on the locomotive are effective at the same time undesired slipping and wear of the locomotive wheels may occur so that while it is normally undesirable that both of the brakes be effective on the locomotive at the same time it is however desirable under certain conditions to be able to apply the fluid pressure brakes on the locomotive while the electric brakes are effective.

The principal object of the invention is therefore the provision of an improved locomotive brake equipment embodying both fluid pressure and electric braking means and interlock means so arranged as to prevent an automatic application of the fluid pressure brakes on the locomotive at the same time as when the electric brakes are effective, but which permits application and release of the fluid pressure brakes on the locomotive by operation of the independent portion of the brake valve device when the electric brakes are effective.

Other objects and advantages will become apparent from the following more detailed description of the invention.

Figure 6:
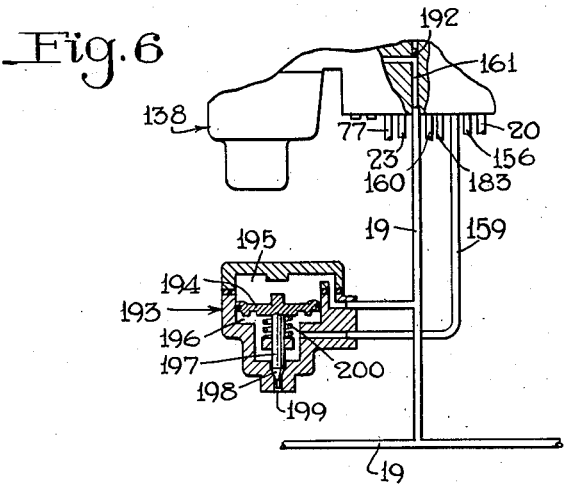
Figure 7:
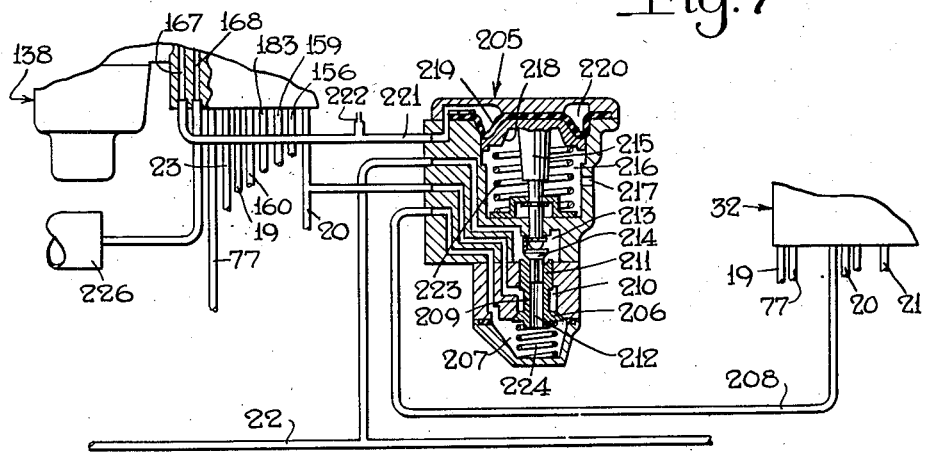
Figure 8:
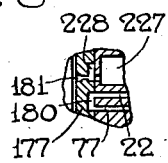

In the accompanying drawings, Figs. 1, 1a, when the right-hand edge of Fig. 1 is matched to the left-hand edge of Fig. 1a, is a diagrammatic view, mainly in section, of a portion of a locomotive brake equipment embodying the invention; Figs. 2 and 3 are sectional views of an independent brake valve device shown in Fig. 1 but with the rotary valve thereof in different positions; Fig. 4 is a diagrammatic view of a portion of an engineer's automatic brake valve device shown in Fig. 1 but with the rotary valve thereof in a different position; Fig. 5 is a diagrammatic view of the equalizing portion of a distributing valve device shown in Fig. 1a but with the parts thereof shown in a different position; and Figs. 6, 7 and 8 are diagrammatic views of modifications of the invention.

Description

As shown in the drawing, the pneumatic brake equipment for each unit of a multiple unit locomotive comprises a distributing valve device 1, a brake cylinder device 2 and a main reservoir 3. On the lead locomotive unit there is also provided an engineer's brake valve device comprising an automatic brake valve device 4 and an independent brake valve device 5.

The electric brake apparatus for each unit comprises a propulsion motor 6 adapted to be operated as a generator for supplying electric current to a dynamic braking resistor 7 for providing a decelerating force for braking purposes. On the control unit of the locomotive there is provided an engineer's controller 8 having a power-on position and a dynamic-brake-on position as indicated by suitable legends. In the power-on position a contact 9 in the controller will bridge a pair of contacts 10 and 11 for completing a circuit for supplying current to the motor 6, said circuit being by way of example from a current supply wire 12, the contact 9, a wire 13, motor 6 and a grounded conductor 14. In the dynamic-brake-on position a contact 15 is adapted to bridge contacts 11 and 16 for placing motor 6 in a dynamic braking circuit including resistor 7 which is effective to produce dynamic braking upon operation of the motor 6 as a generator, in a well-known manner.

According to the invention, we add to the brake apparatus above described an interlock device 17 one of which will be employed on each locomotive unit. For each unit we also add a dynamic brake cut-out switch device 18.

In the drawing, only the brake equipment for the leading unit of a locomotive is shown as it is deemed sufficient for a clear understanding of the invention, but it is desired to point out that a distributing valve device 1, interlock device 17 and switch device 18 will be provided on all other units of the locomotive, the like devices on all units being adapted to operate in synchronism with and in the same manner as those on the leading unit of the locomotive, as will be subsequently described.

The numeral 19 designates a brake pipe adapted to extend through the locomotive for connection with the brake pipe on a train, said pipe being connected to the distributing valve device 1, to the interlock device 17 and to the engineer's automatic brake valve device 4. The numeral 20 designates a main reservoir pipe adapted to extend through the locomotive and on each unit to be connected to a main reservoir 3, to the distributing valve device 1, to the interlock device 17 and also to the engineer's brake valve device on the leading unit of the locomotive. Numeral 21 designates the usual controlled emergency pipe connected to the independent brake valve device 5 and to the distributing valve device 1 at least on the leading unit of the locomotive while in some cases said pipe may extend completely through the locomotive for connection with each distributing valve device thereon. Numeral 22 designates the usual independent release pipe adapted to extend through the locomotive for connecting the distributing valve device 1 on each unit to the independent brake valve device 5 on the leading unit. Numeral 23 designates the usual independent application pipe also adapted to extend through the locomotive for connection with each distributing valve device 1 and to the independent brake valve device 5, the connection between said pipe and the distributing valve device, according to the invention, being interlocked through the interlock device 17, as will be later described.

The distributing valve device 1, and the engineer's automatic brake valve device 4 and independent brake valve device 5 are substantially the same as fully disclosed in Westinghouse Air Brake Company's No. 8EL Locomotive Brake Equipment Pamphlet No. 5032-1, Sup. 3, dated November 1943 and also substantially the same as the locomotive brake equipment fully disclosed in Patent No. 2,009,841 issued to Ellis E. Hewitt on July 30, 1935. The structure and operation of such brake equipment is well-known and only such portions thereof have been disclosed in the drawing and will hereinafter be described as deemed essential to an understanding of the invention.

As shown in the drawing the distributing valve device 1 comprises an application portion 27, an equalizing portion 28, a reduction chamber cut-off valve device 29, a release valve device 30 and a safety valve device 31 all of which parts are carried by a pipe bracket 32 in which there is provided a reduction chamber 33. Also carried by the pipe bracket 32 is a controlled emergency or delay valve device 34. The pipe bracket 32 is in turn carried by a reservoir portion in which there are provided a pressure chamber 35 and an application chamber 36.

The application portion 27 of the distributing valve device comprises a fluid pressure supply valve 38 arranged to control flow of fluid under pressure from a chamber 39, constantly supplied with fluid under pressure from the main reservoir pipe 20 through a passage 40 extending through the pipe bracket 32 and connected to said chamber, to a chamber 41 which is open through a passage and pipe 42 to the brake cylinder device 2 for applying the brakes on the locomotive unit. A brake cylinder release valve 43 contained in chamber 41 controls communication between said chamber and an atmospheric port 44 for controlling release of fluid under pressure from the brake cylinder device 2 for effecting a release of brakes. The release valve 43 is loosely mounted between operating shoulders 45 on a stem 46 projecting from an application piston 47. Upon supply of fluid to a chamber 48 at one side of the piston 47 said piston is adapted to move the release slide valve 43 to a position for closing communication between chamber 41 and the exhaust port 44 and for then opening the application valve 38 to supply fluid under pressure to the brake cylinder device 2. As fluid is thus supplied to the brake cylinder device the pressure of such fluid in chamber 41 acts on an enlargement 49 of the piston stem 46 and through a choke 50 in a chamber 51 on the opposite side of piston 47, whereby, when the pressure in the brake cylinder device becomes increased to substantially the same degree as acting in the application chamber 48, the piston 47 will be moved in the direction of said chamber to permit closing of the application valve 38 by a spring 52 for thereby limiting the degree of brake application on the locomotive in accordance with the pressure of fluid provided in the application piston chamber 48. If the pressure of fluid in chamber 48 is reduced the opposing pressure in chambers 51 and 41 will operate the application piston 47 to move the slide valve 43 to the position in which it is shown in the drawing for thereby releasing fluid under pressure from chamber 41 and from the brake cylinder device 2 to effect a release of brakes. In other words, the degree of pressure of fluid provided in the brake cylinder device 2 and thereby the degree of brake application on the locomotive unit may be varied according to the pressure of fluid provided in the application cylinder 48, as well-known.

The application piston chamber 48 is connected through a passage 53 in the bracket to the controlled emergency valve device 34 and through said device to a passage 54 leading to the equalizing portion 28 and to the reduction chamber cut-off valve device 29.

The equalizing portion of the distributing valve device comprises an equalizing piston 58 at one side of which is a chamber 59 open to the brake pipe 19 through a passage 60. At the opposite side of piston 58 is a valve chamber 61 open through a passage 62 to the pressure chamber 35. A main slide valve 63 contained in the chamber 61 is loosely mounted between two spaced shoulders 64 provided on a stem 65 projecting from the piston 48 for operation by said piston. Contained in a recess in piston stem 65 and mounted to slide on the main slide valve 63 is an auxiliary slide valve 66.

The reduction chamber cut-off valve device 29 comprises a piston 68 and a slide valve 69 connected to said piston for movement thereby to either of two different positions. The slide valve 69 is contained in a chamber 70 at one side of piston 68 while at the opposite side is a chamber 71 containing a spring 72 for urging said piston and slide valve 69 to the position in which they are shown in the drawing.

The release valve device 30 comprises a check valve 73 contained in a chamber 74 open to passage 54 and arranged to control communication between said chamber and a chamber 75 which is open through a passage 76 to a pipe 77 leading to the interlock device 17. A spring 78 in chamber 74 acts on the check valve 73 for urging it to a closed position. For opening the check valve 73 against spring 78 a piston 79 is provided. The piston 79 has a stem 80 projecting through a chamber 81 at one side of the piston and a bore in the partition separating said chamber from chamber 75 into the latter chamber wherein its end is arranged to contact valve 73 to move it from its seat upon movement of said piston in the direction of chamber 81. A valve 82 on the piston stem 80 in chamber 75 is arranged to contact a seat around the bore through the partition just mentioned for closing communication between chambers 75 and 81 when the stem is out of contact with the check valve 73. A spring 83 in chamber 75 acts on the stem 80 for urging the valve 82 to its seated position. When the valve 82 is unseated by piston 79 chamber 75 and thereby the connected passage 76 will be open to atmosphere through one or more grooves 84 in the piston stem 80, chamber 81 and thence through an atmospheric port 85. A sealing ring 86 in chamber 81 is provided for sealing engagement by piston 79 when in the position for opening the check valve 73. At the opposite side of piston 79 is a control chamber 87 open to a passage 88 extending through the bracket 32 and connected to the independent release pipe 22.

The controller emergency valve device 34 is provided to either permit a slow or a fast emergency application of brakes on the locomotive in accordance with presence or absence of fluid under pressure in the controlled emergency pipe 21, but insofar as the invention is concerned it may be considered merely as a means for connecting passages 53 and 54 in the bracket to each other.

The engineer's automatic brake valve device 4 comprises a handle 91 having the usual release and running positions for supplying fluid under pressure to the brake pipe 19 for releasing brakes on the locomotive and cars of a train. The handle 91 also has the usual service position for reducing the pressure of fluid in the brake pipe 19 at a service rate to effect a service application of brakes on the locomotive and cars of a train, and the usual lap position for limiting the degree of a service reduction in brake pipe pressure in the usual manner. The brake valve handle 91 also has the usual emergency position for effecting an emergency reduction in pressure in the brake pipe 19 and thereby an emergency application of brakes on the locomotive and cars of a train.

In the running position of the brake valve handle 91 a cavity 92 in the usual rotary valve 93 controlled by said handle opens a passage 94 from the independent brake valve device 5 to an atmospheric passage 95, this communication being closed in all other positions of said handle. In emergency position of the handle 91 a maintaining port 96 in the rotary valve (Fig. 4) opens passage 94 to a chamber 97 containing the rotary valve 93 which chamber is constantly supplied with fluid under pressure, as well known.

The independent brake valve device 5 comprises a rotary valve 99 and a handle 100 for turning said rotary valve to its different positions including a running position in which it is shown in Fig. 1, a release position as shown in Fig. 2 and an application position as shown in Fig. 3. In the running position of the brake valve handle 100, a cavity 101 in rotary valve 99 connects passage 94 to a passage 102 connected to the independent application pipe 23, while the independent release pipe 22 is vented by way of a passage 107, a cavity 103 in said rotary valve and an exhaust port 104. In the release position of rotary valve 99 a cavity 105 therein connects the independent application passage 102 to the exhaust port 104 while a port 106 in said rotary valve opens passage 107 to a chamber 108 above the rotary valve and which chamber is constantly supplied with fluid under pressure, as well known. In the application position of the rotary valve 99 (Fig. 3) a cavity 109 therein opens the independent release passage 107 to the exhaust port 104 while a port 110 connects the rotary valve chamber 106 to the independent application passage 102.

The independent application pipe 23, which extends through the locomotive, is adapted to be connected to pipe 77 leading to the distributing valve device 1 through the interlock device 17, in a manner which will be later described, except upon an emergency reduction in pressure in the brake pipe 2 when such connection will be closed.

Except for the interlock between the independent application pipe 23 extending through the locomotive and pipe 77 connected to the distributing valve device just mentioned, the structure so far described is the same as in the instruction pamphlet above referred to and its operation briefly as follows.

Assuming that handle 91 of the automatic brake valve device 4 is in its running position, in which it is shown in the drawing, the brake pipe 19 will be charged with fluid under pressure and passage 94 from the independent brake valve device will be open to atmosphere through the atmospheric passage 95. Further assume that handle 100 of the independent brake valve device is in its running position in which the independent application pipe 23 will be connected to passage 94 by way of passage 102 and cavity 101 in the independent brake valve rotary valve 99 and that the independent release pipe 22 is open to atmosphere by way of cavity 103 in said rotary valve and exhaust port 104.

With the brake pipe 19 charged with fluid under prressure the equalizing piston chamber 59 in the distributing valve device will likewise be charged and the parts of the equalizing portion 28 of the distributing valve device will be in their brake release position in which they are shown in the drawing and in which a feed passage 111 around the piston 58 will be open to permit fluid under pressure to flow from chamber 59 to valve chamber 61 and thence to pressure chamber 35 to permit charging of the latter two chambers with fluid at the pressure in the brake pipe. With the main equalizing slide valve 63 in its release position, chambers 71 and 70 at opposite sides of piston 68 in the reduction chamber cut-off valve device 29 are connected to each other through passages 112 and 113 respectively, and a passage 114 in said slide valve whereby spring 72 is permitted to hold the piston 68 and slide valve 69 in their normal position in which they are shown in the drawing. With the slide valve 69 thus positioned a cavity 114a therein opens passage 54 to passage 76, and passage 54 being connected through the controlled emergency valve device 34 to the application piston chamber 48, said chamber is thereby open to passage 76 and thereby through pipe 77 and the independent release pipe 23 to atmosphere via the independent and automatic brake valve devices, whereby the application portion 27 of the distributing valve device will be permitted to assume its release position for releasing brakes on the locomotive. Passage 114 in the equalizing slide valve 63 is open to a cavity 115 in said slide valve to which the application chamber 36 is also open by way of a passage 116, and said cavity is open to the vented passage 54 whereby chambers 71 and 70 in the reduction chamber cut-off valve device 29 and the application chamber 36 are both vented to atmosphere. The reduction reservoir 33 is also vented to atmosphere with the equalizing slide valve 63 in its release position by way of a passage 117, a cavity 118 in said slide valve and an atmospheric port 119.

Now let it be assumed that the engineer moves the automatic brake valve device handle 91 from running position to service position for effecting a service reduction in pressure in brake pipe 19 and that after a desired reduction is thus obtained said handle is moved back to lap position for terminating and limiting such reduction. Upon thus reducing the pressure of fluid in the brake pipe 19 a corresponding reduction in pressure will occur in equalizing piston chamber 59 in response to which the equalizing piston 58 will move the slide valves 66 and 63 to their service position in which these parts are shown in Fig. 5 of the drawing. In service position of the auxiliary slide valve 66 a service port 122 in the main slide valve 63 is open to valve chamber 61 while at the seat of said main slide valve said port is brought into registry with a passage 123, as a consequence of which, fluid under pressure from the pressure chamber 35 is permitted to flow to the reduction chamber cut-off valve device 29 and through a cavity 124 therein in slide valve 69 to passage 117 leading to the reduction reservoir 33. In service position of slide valve 63 passage 117 is also connected through cavity 118 in said slide valve to passage 113 whereby fluid will be supplied to chamber 70 in the reduction chamber cut-off valve device at the same time as it flows to the reduction chamber 33. When a certain pressure of fluid is thus obtained in chamber 70 such pressure acting on piston 68 will move it against spring 72 since chamber 71 is still vented to atmosphere by way of passage 112, a passage 124 in the main slide valve 63 and the atmospheric port 119, and this movement of said piston and thereby of the slide valve 69 will close communication between passages 123 and 117 to terminate flow of fluid under pressure to the reduction chamber 33 and open communication between said passage 123 and passage 54. After this chosen reduction in pressure in pressure chamber 35 by flow into the reduction chamber 33 fluid under pressure from said pressure chamber will flow to passage 54 and thence through the controlled emergency valve device 34 to the application piston chamber 48 in the application portion of the distributing valve device and actuate said application portion to supply fluid at a corresponding pressure to the brake cylinder device 2 for applying the brakes on the locomotive.

When by flow of fluid under pressure from the pressure chamber 35 and valve chamber 61 to the application piston chamber 48 the pressure of such fluid becomes reduced to a degree slightly lower than the reduced brake pipe pressure acting in chamber 59, the equalizing piston 58 will move in the direction of the lower pressure for thereby shifting the auxiliary slide valve 66 relative to the main slide valve 63 for lapping the service port 122 to prevent further flow of fluid under pressure from the pressure chamber 35 to the application piston chamber 48 for thereby limiting the degree of brake application in accordance with the reduction in pressure in the brake pipe 19 effected by operation of the engineer's automatic brake valve device 4.

It is also desired to point out that as fluid under pressure is supplied from the pressure chamber 35 to the application piston chamber 48 for effecting a service application of brakes, as just described, fluid under pressure from the former chamber will also equalize from passage 54 through cavity 115 in the equalizing slide valve 63 and passage 116 into the application chamber 36.

In case the handle 91 of the engineer's automatic brake valve device 4 is moved to emergency position an emergency venting of fluid under pressure from the brake pipe 19 and thereby from equalizing chamber 59 in the distributing valve device will occur. In such a case the equalizing piston 58 will move to an emergency position in which a port 127 in the main slide valve 63 moves into registry with passage 123 to permit flow of fluid under pressure from the pressure chamber 35 to the application piston chamber 48 in the same manner as in effecting a service application of brakes but at a more rapid rate, the reduction chamber cut-off valve device 29 functioning during such operation in the same manner as in effecting a service application of brakes.

It is to be noted however, that in emergency position of the equalizing slide valve 63 a part 128 in the main slide 63 laps passage 116 leading to the application chamber 36 so that fluid will not be supplied to said chamber from the pressure chamber 35 in effecting an emergency application of brakes, although in one position of the controlled emergency valve device 34 supply of fluid to the application chamber 36 will occur for delaying the application of locomotive brakes in the handling of a long freight train which however is not pertinent to the invention.

When the reduction chamber cut-off valve device 29 moves to its left-hand or cut-off position above mentioned in effecting either a service or an emergency application of brakes, a passage 129 controlled by the slide valve 69 is opened to the valve chamber 70 and also past the left hand end of the main equalizing slide valve 63 to the equalizing valve chamber 61, whereby chamber 70 will be maintained charged with fluid at the pressure in the pressure chamber 35 to insure that the parts of the reduction chamber cut-off valve device will remain in their left-hand position as long as the brakes on the locomotive remain applied.

In effecting a service application of brakes a cavity 130 in the auxiliary slide valve 66 is adapted to connect passage 114 in the main slide valve, which is connected to passage 54 and thereby the application piston chamber 48, to a passage 131 which registers with a passage 132 leading to the safety valve device 31 which is thereby operative during the time the application of brakes is being effected to insure that the pressure in the application piston chamber 48 will not increase above a chosen degree, this communication being closed by the auxiliary slide valve 66 in its lap position for preventing leakage of fluid under pressure through the safety valve device from undesirably reducing the pressure of fluid in the application piston chamber 48. The safety valve device 31 is also connected to the application piston chamber 48 in emergency position of the equalizing portion of the distributing valve device by way of passage 132 and passage 127 in the main slide valve 63, this communication being maintained as long as the emergency application of brakes is in effect. Permissible leakage of the safety valve device 31 is of no consequence when an emergency application of brakes is in effect since in emergency position of the brake valve handle the maintaining port 96 (Fig. 4) in the rotary valve 93 permits flow of fluid under pressure to the application passage 94 and thence through cavity 101 in the independent brake valve device to the independent application pipe 23 which heretofore has been connected directly by way of pipe 77 to chamber 75 in the release valve device 30 of the distributing valve device, whereby fluid supplied to the latter chamber will flow past the check valve 73 to passage 54 and thence to the application piston chamber 48 for maintaining the pressure therein at the adjustment of the safety valve device 31. It is to be noted that this supply of fluid through the maintaining port 96 in the automatic brake valve device to the independent application pipe 23 had to be adjusted, heretofore, to the number of units in the locomotive and hence the number of application piston chambers 48 in which it was desired that the pressure of fluid be maintained and hence has heretofore been a compromise. According to one feature of the invention the need for the maintaining port 96 has been dispensed with in connection with a brake equipment of the type under consideration but said port will be maintained in the brake equipments for use with a locomotive not employing dynamic brakes.

When the brakes on the locomotive are applied either in response to a service reduction or an emergency reduction in pressure in the brake pipe the engineer may return the handle 91 of the automatic brake valve device to its release position for recharging the brake pipe 19 and reestablishing communication between passage 94 in the brake valve device and the vent port 95 therein by way of cavity 92 in the rotary valve 93. Upon such recharge of the brake pipe and thereby of piston chamber 59 of the distributing valve device the parts of the equalizing portion will be returned to their release position in which the pressure chamber 35 will be recharged with fluid under pressure and valve chamber 70 in the reduction chamber cut-off valve device 29 will be opened by way of passage 129 and passage 114 in the main slide valve to passage 112 leading to piston chamber 71 whereupon the pressures of fluid in chambers 70 and 71 will be equalized to permit spring 72 to return piston 68 and the slide valve 69 to their normal position. When the slide valve 69 thus obtains normal position the application piston chamber 48 and application chamber 36 will be vented to atmosphere by way of passage 54, cavity 114a in the reduction chamber cut-off valve device 29, thence through passage 76, pipe 77, the independent application pipe 23 and the brake valve devices 3 and 4, whereby the locomotive brakes will be released.

Now let it be assumed that with the brakes on the locomotive applied with the engineer's automatic brake valve device 4 either in service lap position or in emergency position the engineer desires to release the brakes on the locomotive independently of the brake pipe 19 and hence without effect on the brakes on the cars of a train. To accomplish this he will move handle 100 of the independent brake valve device from its running position (Fig. 1) to its release position (Fig. 2). In release position of the independent brake valve device fluid under pressure will be supplied to the independent release pipe 22 and thence to piston chamber 87 in the release valve device 30. The pressure of fluid thus provided in chamber 87 will operate the independent release piston 79 to unseat the check valves 82 and 73 to permit flow of fluid under pressure from the application piston chamber 48 to chamber 75 and thence past the open valve 82 and through groove 84 to chamber 81 and from the latter chamber to atmosphere through the passage 85. If less than a complete release of brakes on the locomotive is desired then as soon as a desired degree of such release is obtained the engineer may return the independent brake valve device to running position for venting the quick release piston chamber 87 by way of the independent release pipe 22 whereupon the check valve 73 will close to hold the remaining fluid under pressure in the application piston chamber 48 to thereby retain a corresponding degree of brake application on the locomotive. A complete release of locomotive brakes may be obtained by holding the independent brake valve handle 100 in its release position for a sufficient length of time.

It is to be noted that when either an automatic service or an emergency application of brakes on the locomotive is effected fluid supplied by the application portion 27 of the distributing valve device to passage 42 for flow to the brake cylinder device 2 to actuate same will also flow past a check valve 133 and then through a choke 134 to passage 76 and through pipe 77 to the independent application pipe 23, whereby said pipe and passage will become charged with fluid at the same pressure as acting in the brake cylinder device 2 and thus the same as that acting in the application piston chamber 48 while the brakes on the locomotive are applied. The purpose of this is to have the independent application pipe 23 charged with fluid at the same pressure as in the application piston chamber 48 when the locomotive brakes are applied so that when said piston chamber is connected to said pipe for effecting a release of brakes, and particularly a graduated release of brakes by operation of either the automatic brake valve device 4 or independent brake valve device 5, there will be no undesired drop of pressure in said piston chamber to charge said pipe which would result in a considerable and uncontrolled reduction and consequent corresponding release of brakes on the locomotive. This is a very important feature of the No. 8EL locomotive brake equipment and according to the invention is not dispensed with.

At any time, either with the brake pipe 19 fully charged and the brakes on the locomotive and connected cars of a train completely released or after a release of brakes on the locomotive effected by operation of the independent brake valve device while retaining the brakes on the cars of a train applied, the engineer may reapply the brakes on the locomotive by moving the independent brake valve handle to its application position (Fig. 3) for thereby supplying fluid under pressure to the independent application pipe 23 from which it will flow to pipe 77 and thence through passage 76 and past the independent release check valve 73 to passage 54 and the application piston chamber 48. A release of such application may be obtained by returning the independent brake valve handle 100 to its independent release position (Fig. 2) or if the automatic brake valve device 4 is in its release position the return of the independent brake valve handle 100 to its running position will provide for such release.

The interlock device 17 added to the No. 8EL locomotive brake equipment in accordance with the invention comprises a selector valve device 137, an emergency interlock device 138 and a dynamic brake control magnet 139.

The selector valve device 137 comprises a piston 140 at one side of which is a chamber 141 open through a passage 142 to the magnet device 139 and containing a spring 143 acting on the piston for urging it to the position in which it is shown in the drawing. At the opposite side of piston 140 is a chamber 144 open through a passage 145 to the main reservoir pipe 20 and hence adapted to be constantly charged with fluid at main reservoir pressure. A slide valve 146 contained in chamber 144 is connected to a stem 147 projecting from piston 140 for movement by and with said piston.

The magnet valve device 139 comprises a valve 147 having oppositely arranged seats for controlling communication between a chamber 148 containing said valve and, respectively, a chamber 149 and an atmospheric exhaust passage 150. The magnet device 139 further comprises a magnet 151 operative upon energization to actuate valve 147 to open chamber 148 to passage 150. Upon deenergization of the magnet 151 a spring 152 in chamber 149 is adapted to actuate the valve 147 to open communication between chambers 148 and 149, chamber 149 being open to passage 145 and hence constantly supplied with fluid under pressure from the main reservoir pipe 20. By wires 153 and 154 the magnet 151 is adapted to be placed in circuit with the locomotive propulsion motor 6 and dynamic braking resistor 7 when the controller 8 is moved to its dynamic-brake-on position whereby current generated by said motor will act to energize said magnet. When the controller 8 is in its power-on position the magnet 151 is adapted to be deenergized.

Thus it will be seen that when the magnet 151 is deenergized, as it will be at all times except during dynamic braking, fluid under pressure from passage 145 will flow past the valve 147 to piston chamber 141 in the selector valve device 137 and equalize with the pressure of fluid in valve chamber 144 to permit spring 143 to move the piston 140 and the slide valve 146 to their normal position in which they are shown in the drawing, while when the dynamic brakes on the locomotive are effective the energization of magnet 151 will cause venting of fluid under pressure from piston chamber 141 to permit pressure of fluid in chamber 144 at the opposite side of piston 140 to actuate said piston and thereby slide valve 146 to a right-hand position which may be defined by engagement between said piston and a gasket 155.

According to the invention we may also add a pipe 156 to the locomotive brake equipment on the lead unit only, one end of which pipe is connected to passage 94 extending between the rotary valves 93 and 99 of the automatic and independent brake valve devices 4 and 5, and the other end of the said pipe is connected to a passage 157 terminating at the seat of the respective selector slide valve 146. We also add an initial release reservoir 158 which is connected by a pipe and passage 159 to the seat of the selector slide valve 146. We further connect the pressure chamber 35 in the distributing valve device to the seat of the selector slide valve 146 by way of a pipe and passage 160. The brake pipe 19 is also connected to the seat of slide valve 146 by way of a passage 161 containing a check valve 162 which is arranged to prevent flow of fluid under pressure in the direction away from said brake pipe but to permit flow in the opposite direction to said brake pipe.

When the power controller 8 is out of dynamic-brake-on position and the magnet 151 is thereby deenergized and the parts of the selector valve device 137, including slide valve 169, are in the position in which they are shown in the drawing the passages 161, 160 and 157 are all lapped by said valve, while passage 159 and thereby the initial release reservoir 158 are open to atmosphere through a cavity 163 in said slide valve and an atmospheric port 164.

When the dynamic brake controller 8 is moved to its dynamic-brake-on position energizing magnet 151, the selector piston 140 and slide valve 146 will move to their right-hand position for connecting the added pipe 156 to the atmospheric port 164 by way of cavity 163 and for at the same time connecting the pressure chamber passage 160 through cavity 165 in said slide valve to passage 159 leading to the initial release reservoir 158 and also to passage 161 leading to the under side of the check valve 162. The connecting of pipe 156 to atmosphere under this condition is without effect while the connecting of pressure chamber 35 to the initial release reservoir 158 merely permits the pressure of fluid in said chamber to equalize into said reservoir at a pressure lower than in the brake pipe 19 which latter pressure maintains the check valve 162 seated to prevent flow of fluid from the brake pipe to said reservoir. With the pneumatic brakes on the locomotive released this reduction in pressure in the pressure chamber 35 into the reservoir 158 is without effect.

However, let it be assumed that by operation of the engineer's automatic brake valve device 4, the pressure of fluid in the brake pipe 19 has been reduced and the distributing valve device 1 has operated to apply the brakes on the locomotive. Under this condition the pressure of fluid in the pressure chamber 35 will be the same as the reduced pressure of fluid in the brake pipe 19, as will be apparent, thus when the dynamic brakes on the locomotive become effective and the selector valve moves to its right-hand position in which the pressure chamber 35 is connected to the intitial release reservoir 158 the pressure of fluid in said pressure chamber will be promptly reduced into said reservoir to a degree below that in the brake pipe 19. As a result the equalizing piston 38 and slide valves 63, 66 of the distributing valve device will be pulled back from their service or service lap position to their release position whereupon, by way of the reduction cut-off valve device 29 which will be returned to its normal position upon return of the equalizing portion of the distributing valve device to its release position, the application piston chamber 48 will be placed in communication with pipe 77 and thence connected through the emergency interlock device 138, in a manner which will be later described, to the independent application pipe 23 which will be vented through the independent brake valve device 5, pipe 156, cavity 163 in the selector slide valve 146 and the exhaust cavity 164 to effect a release of fluid under pressure from the brake cylinder device 2 and thereby a release of brakes on the locomotive independently of the pressure of fluid in the brake pipe and hence independently of the brakes on the cars of the train. It will be noted that with the brake valve handle 91 in either service or service lap position communication between passage 94 and the atmosphere is closed, as hereinbefore described, which would prevent release of fluid under pressure from the independent application pipe 23 by way of the automatic brake valve device, but the added pipe 156, cavity 163 and exhaust port 164 in the selector slide valve 146 accomplishes this result when the dynamic brakes on the locomotive are cut-in at a time the brakes on the cars of a train are applied.

It will thus be seen that even if the fluid pressure brakes on the locomotive are applied at the time the dynamic brakes on the locomotive are cut-in such application of the fluid pressure brakes will be released to avoid both brakes being effective at the same time.

If, while the dynamic brakes on the locomotive are effective, the engineer operates the brake valve device 4 to effect a further reduction in pressure in the brake pipe 19 and thereby a further application of fluid pressure brakes on the cars of a train, the pressure in the pressure chamber 35 will be correspondingly reduced by flow of fluid under pressure past the check valve 162 in the interlock device 17 to the brake pipe 19 to insure that the equalizing portion of the distributing valve device will remain in its brake release position to maintain the fluid pressure brakes on the locomotive released as long as the dynamic brakes are effective.

Also connected to the seat of the selector slide valve 146 are two passages 167 and 168, said slide valve having a port 169 adapted to register with passage 168 in the normal position of said slide valve, and a cavity 170 for establishing communication between said passages in the dynamic braking position of said slide valve. These passages, port and cavity perform no function in the structure shown in Fig. 1 but are adapted for use with the modification shown in Fig. 7, as will hereinafter be described.

The emergency interlock device 138 comprises a piston 172 at one side of which is a chamber 173 open to atmosphere through a port 174 and at the opposite side is a valve chamber 175 constantly supplied with fluid under pressure from the main reservoir through passage 145. The piston 172 has a stem 176 projecting into chamber 145 and to which there is connected a slide valve 177 for movement with and by the piston 172. Below the piston 172 is another piston 178 of larger diameter than piston 172 and subject on one side to atmospheric pressure in chamber 173 while at the opposite side is a chamber 179 which is open to the brake pipe passage 161 on the brake pipe side of the check valve 162. When the brake pipe 19 and thereby chamber 179 are charged with fluid under pressure the piston 178 is adapted to move into contact with the piston 172 and actuate the latter and the slide valve 177 to a normal position in which these parts are shown in the drawing. When the brake pipe 19 is vented to effect an emergency application of brakes, a like reduction in pressure will occur in chamber 179 so that the pressure of fluid in valve chamber 175 acting on the piston 172 will move said piston and the piston 178 to a lower emergency position.

In the normal position of the emergency interlock slide valve 177 a cavity 180 therein connects pipe 77 from the distributing valve device 1 to the independent application pipe 23, this communication being maintained at all times except in case of an emergency application of brakes so as to permit the distributing valve device to be controlled from the automatic brake valve device 4 and independent brake valve device 5 in the usual manner.

In emergency position of the emergency interlock slide valve 177, pipe 77 and the independent application pipe 23 are disconnected from each other and a maintaining port 181 in the slide valve 177 registers with the passage connection to pipe 77 whereby fluid under pressure from the main reservoir present in valve chamber 175 is permitted to flow to said pipe and thence past the check valve 73 in the distributing valve device 1 to the application piston chamber 48 for maintaining the pressure therein and thereby in the brake cylinder device 2 at the adjustment of the safety valve device 31 as long as the brakes remain applied in emergency. It is to be noted that in a multiple unit locomotive the pressure in the application piston chamber 48 of each distributing valve device, and thereby the pressure of fluid in the brake cylinder device connected to such distributing valve device, will be maintained against leakage by the supply of fluid under pressure through the restricted maintaining port 181 on that unit, in contrast to the compromise maintenance heretofore provided through the usual single maintaining port 96 of the automatic brake valve device for all distributing valve devices on a multiple unit locomotive. It is to be noted that when the interlock valve device 17 is employed, the usual maintaining port 96 is valueless since in emergency fluid supplied thereby to pipe 23 will be blocked by the emergency interlock slide valve 177, but such port is maintained in the equipment to provide the brake cylinder pressure maintenance in brake equipments not employing said interlock valve device.

The emergency interlock slide valve 177 also has a cavity 182 for opening a pipe 183 to an atmospheric passage 184 in the normal position of said slide valve while a port 185 in said slide valve is adapted to permit flow of fluid under pressure from valve chamber 175 to said pipe in the emergency position of said slide valve.

The pipe 183 leads to the dynamic brake cut-off switch device 18 which comprises a contact 186 arranged to open and close the dynamic brake circuit through the resistor 7. The contact 186 is carried by one end of the rod 187 the other end of which is connected to a piston 188. At one side of the piston 188 is a chamber 189 open to pipe 183 and said piston is operative upon supply of fluid under pressure to said pipe and chamber, when the emergency selector device 138 moves to its lower position in effecting an emergency application of brakes, to actuate the contact 186 to its circuit opening position for thereby cutting out the dynamic brakes on the locomotive under such a condition. At all other times, that is, when the brake pipe is charged with fluid under pressure and during a service application of brakes the parts of the emergency interlock device 138 will be in their upper position for venting chamber 189 in the cut-out switch device 18. With chamber 189 vented a spring 190 acting on piston 188 will move the contact 186 to its circuit closing position to permit operation of the dynamic brakes.

Description of Fig. 6

In the structure shown in Figs. 1, 1a and above described, when the dynamic brakes on the locomotive are cut into operation and the selector valve device 137 responds thereto, the pressure of fluid in the pressure chamber 35 and the equalizing slide valve chamber 61 is reduced into the release reservoir 158 to pull the parts of the equalizing portion of the distributing valve device back to their release position in case they are in service lap position, and to then maintain said parts in release position by flow of fluid under pressure from the pressure chamber 35 back to the brake pipe past check valve 162 in case of a further or subsequent reduction in pressure in the brake pipe 19. Instead of thus permitting air to flow from the pressure chamber 35 back to the brake pipe 19, which would increase the amount of air which had to be released from the brake pipe by operation of the engineer's automatic brake valve device 4 to effect a service application of brakes or a further degree of such application on the cars of a train, the connection of the pressure chamber 35 to the brake pipe by way of the check valve 162 and to the initial release reservoir 158 may both be dispensed with and the structure shown in Fig. 6 may be employed instead.

According to this modification we add a plug 192 to the dynamic interlock device 17 in the passage 161 above the connection between the brake pipe and piston chamber 179 in the emergency interlock device 138 for thereby closing communication between the brake pipe and the selector valve device 137. We further add an equalizing discharge valve mechanism 193 comprising a piston 194 at one side of which is a chamber 195 open to the brake pipe 19 while at the opposite side is a chamber 196 open to passage 159 in the dynamic interlock device 17 and thus vented to atmosphere when the selector valve device 137 is in its normal position and adapted to be connected to passage and pipe 160 and thereby to the pressure chamber 35 when the selector valve device 137 moves to the position assumed when the dynamic brakes on the locomotive are cut into operation. Projecting from the piston 194 through chamber 196 is a stem 197 on the end of which is a discharge valve 198 arranged to cooperate with a seat for controlling communication between chamber 196 and an atmospheric vent port 199. A spring 200 contained in chamber 196 acts on the piston 194 with a force urging it toward chamber 195.

In operation, when the dynamic brakes on the locomotive are not effective and the parts of the selector valve device 137 are in their normal position chamber 196 below the equalizing discharge valve piston 194 will be vented to atmosphere through cavity 163 and vent port 164, while brake pipe pressure acting in chamber 195 on piston 194 will hold the parts of the discharge mechanism in the position in which they are shown in the drawing. When the dynamic brakes on the locomotive are cut into operation with either the fluid pressure brakes on the locomotive released or applied, the pressure chamber 35 and equalizing slide valve chamber 61 in the distributing valve device will be opened to chamber 196 below the equalizing discharge valve piston 194. At this time the pressure of fluid in the brake pipe 19 and in pressure chamber 35 will be substantially the same regardless of whether the dynamic brakes on the locomotive are released or previously applied in response to a reduction in pressure in the brake pipe, as a result of which, the pressures of fluid acting on the opposite sides of the equalizing discharge valve piston 194 will be substantially the same, so that spring 200 will promptly actuate said piston to open the discharge valve 198 for venting fluid under pressure from the pressure chamber 35 and equalizing slide valve chamber 61. This venting of fluid under pressure from the pressure chamber 35 and equalizing slide valve chamber 61 will continue until such pressure is reduced below that in the brake pipe a degree sufficient for the equalizing piston 194 to move against spring 200 to seat the discharge valve 198. The pressure of spring 200 on the piston 194 is preferably such as to cause the pressure in the pressure chamber 35 and equalizing valve chamber 61 to be reduced sufficiently below brake pipe pressure effective in the equalizing piston chamber 59 to cause the piston 58 to move to its usual retarded recharge position in sealing contact with a gasket 201 for thereby limiting flow of fluid under pressure from the brake pipe to valve chamber 61 and pressure chamber 35 to a minimum degree controlled by the usual retarded recharge choke 202, so as to positively insure that the parts of the equalizing portion of the distributing valve device will assume a release position for effecting a release of brakes on the locomotive in case the pneumatic brakes were effective at the time the dynamic brakes were cut into operation or to positively insure that the pneumatic brakes on the locomotive will be prevented from applying so long as the dynamic brakes are in action.

*Description Fig. 7*

As before described in connection with the structure shown in the Figs. 1, 1a, when the dynamic brakes on the locomotive are cut into operation at a time when the pneumatic brakes are effective the equalizing portion of the distributing valve device returns to its release position to permit movement of the reduction cut-off valve device 29 to its normal position for connecting the application piston chamber 48 to pipe 77 and thence to the independent application pipe 33 through the emergency interlock portion 138 of the dynamic interlock device 17 whereby the fluid under pressure in said chamber will be released to atmosphere through said independent application pipe, the pipe 156 and the exhaust port 164 in the selector valve device 137. Where the locomotive comprises more than one unit it will be noted that this release of fluid under pressure from the application piston chamber 48 on all units must occur through the independent application pipe 23 and the newly added pipe 156 and in case of a maximum number of units in the locomotive such release of brakes on all units may be undesirably delayed. This may be avoided however by the structure shown in Fig. 7 of the drawing which will insure a positive and quick release of brakes on each unit whenever the dynamic brakes are cut into operation.

According to this modification the connection between the independent release pipe 22 and the distributing valve device 1 is controlled by a relay valve device 205. The relay valve device 205 comprises a valve 206 contained in a chamber 207 which is open by way of a passage 208 to the independent release pipe passage 88 (Fig. 1) in the distributing valve device. The valve 206 is carried by one end of a stem 209 extending through a chamber 210 and having its opposite end connected to a plunger 211 slidably mounted in a bore in the casing. The chamber 210 is open to the main reservoir pipe 20 and hence adapted to be constantly supplied with fluid under pressure from the main reservoir. A passage 212 extends axially through the valve 206, stem 209 and plunger 211 with one end open to chamber 207 while the opposite end opens through a valve seat provided on plunger 211 to a chamber 213 containing a valve 214 arranged to cooperate with said seat for closing communication between chamber 213 and the passage 212. The chamber 213 is open to the independent release pipe 22. The valve 214 is connected to one end of a stem 215 which slidably extends through a bore in a partition separating chamber 213 from a chamber 216 which latter chamber is open to atmosphere through a vent port 217. In chamber 216 the end of stem 215 is provided with a follower 218 engaging one side of a flexible diaphragm 219 at the opposite side of which is a chamber 220 connected to passage 167 in the interlock valve device 17 via a pipe 221 having a restricted vent 222 to atmosphere. A spring 223 contained in chamber 216 acts on the diaphragm follower 218 for urging said follower and the diaphragm 219 to the position in which they are shown in the drawing when chamber 220 is vented. In this position of the diaphragm 219 the valve 214 will be unseated from plunger 211 and a spring 224 in chamber 207 will seat the valve 206. The parts of the relay valve device 205 will occupy the position just described, establishing communication between the independent release pipe 22 and the distributing valve device 1 through pipe 208, as long as the dynamic brakes on the locomotive are not in operation in order to permit usual control by the independent brake valve device 5 of the release valve device 30 associated with the distributing valve device 1. According to this modification passage 168 in the interlock valve device 137 is connected to a reservoir 226 which, with the dynamic brakes on the locomotive not operating, will be charged with fluid under pressure from valve chamber 144 in the selector valve device 137 by way of port 169 in the slide valve 146.

When the dynamic brakes on the locomotive are cut into operation at a time when the pneumatic brakes on the locomotive are applied and the selector slide valve 146 moves to its right hand position, the cavity 170 in the selector slide valve 146 will establish communication between passages 167 and 168 and thereby open the reservoir 226 to pipe 221 leading to diaphragm chamber 220 in the relay valve device 205. Fluid under pressure from the reservoir 226 will therefore flow into the diaphragm chamber 220 and deflect the diaphragm 219 against the spring 223 for closing valve 214 to disconnect the distributing valve device 1 from the independent release pipe 22 and for opening valve 206. Upon opening valve 206 fluid under pressure from the main reservoir pipe 20 present in valve chamber 207 will flow to pipe 208 and thence through passage 88 in the distributing valve device to piston chamber 87 in the release valve device 30 of the distributing valve device. The fluid under pressure thus provided in the piston chamber 87 will actuate piston 79 to open valve 82 and then open the valve 73 whereupon fluid under pressure from the application piston chamber 48 will be locally vented to atmosphere past these valves and through the groove 84 in stem 80 to chamber 81 and thence to atmosphere through the vent port 85 to thereby provide a quick local release of fluid under pressure from the application piston chamber and a corresponding quick release of fluid under pressure from the brake cylinder device 2 on the locomotive unit, whereby the pneumatic brakes on the locomotive unit will be promptly released when the dynamic brakes are cut into operation.

As fluid under pressure is supplied from the reservoir 226 to diaphragm chamber 220 in the relay valve device 205 to effect operation thereof such fluid will be gradually dissipated to atmosphere through the restricted passage 222 and when the pressure of such fluid is sufficiently reduced the spring 223 will return the diaphragm 219 and valve 214 to their normal position, in which they are shown in the drawing, and in which the valve 206 will be closed and the other valve 214 open thereby cutting off supply of fluid under pressure from the main reservoir to the release piston chamber 87 in the distributing valve device and venting said chamber to the independent release pipe 22 and thence to atmosphere through the independent brake valve device 5. The volume of reservoir 226 and the flow capacity of the vent port 222 are so related as to insure that the check valve 73 in the release valve device 30 of the distributing valve device will remain open only for a sufficient length of time to obtain the desired release of brakes on the locomotive unit and then promptly close so that in case of an emergency application of brakes occurring immediately following such operation of the quick release device 30 the check valve 73 will be closed to prevent loss of such application on the locomotive unit.

*Description Fig. 8*

If, while the dynamic brakes on the locomotive are in effect and the pressure of fluid in the brake pipe 19 has been reduced to effect the service application of brakes on cars of a train and the pressure in the pressure chamber 35 of the distributing valve device has been correspondingly reduced, an emergency reduction in pressure in the brake pipe 19 is effected to cause an emergency application of brakes on the locomotive and cars of a train, the dynamic brakes will be cut-out as previously mentioned, but due to the reduced pressure in the pressure chamber 35 emergency pressure will not be obtained in the application piston chamber 48 of the distributing valve device and hence the brakes on the locomotive will not be applied to the emergency degree until gradually increased through the maintaining choke 181 in the emergency interlock device 138. In case of emergency it is desired to obtain a full emergency application of brakes on the locomotive as quickly as possible and this may be accomplished by the structure as shown in Fig. 8.

According to this modification, a volume reservoir 227 may be added to the emergency interlock device 138 and be charged with fluid under pressure from valve chamber 175 through the maintaining choke 181 in the normal position of the slide valve 177, whereupon, when said slide valve is moved to its emergency position upon an emergency reduction in pressure in the brake pipe the pressure of fluid in said reservoir will quickly equalize through a cavity 228 in said slide valve into pipe 77 and thence through the distributing valve device into the application piston chamber 48 to provide a prompt increase in pressure in said piston chamber to an emergency degree to thereby obtain the emergency application of brakes on the locomotive. The size of the reservoir 227 may be adequate to thus provide emergency pressure in the application piston chamber 48 even if the emergency reduction of pressure in the brake pipe 19 occurs following a full service reduction in pressure in the brake pipe, in which case, if an emergency reduction in brake pipe pressure occurred with the brake pipe fully charged or following a less degree of service reduction there would be a tendency for the pressure in the application piston chamber 48 to increase above the emergency degree. This however is prevented since the safety valve device 31 is connected to the application piston chamber 48 in emergency and will limit the pressure obtained therein to the desired emergency degree. After the brakes on the locomotive have been applied by fluid under pressure from the reservoir 227 the application will be maintained at the setting of the safety valve device 31 by the supply of fluid under pressure through the maintaining port 181 as previously described.

*Summary*

From the above description it will now be seen that we have provided means adapted to be associated with the No. 8 EL locomotive brake equipment which will prevent an automatic application of locomotive brakes or effect a release of such an application, if effective, when the dynamic brakes on the locomotive are in operation and which will permit usual independent control of the locomotive brakes by operation of the independent brake valve device 5 when the dynamic brakes are in operation. Except for the addition of pipe 156 connected to the independent brake valve device 5 and of pipe 160 connected to pressure chamber 35 no modification of the No. 8 EL brake equipment is necessary for use with dynamic brakes on the locomotive and no feature of said brake equipment is lost by the association of the invention therewith.

Having now described our invention, what we claim as new and desire to secure by Letters Patent, is:

1. In a locomotive brake equipment, in combination, a brake pipe, valve means controlled by opposing pressures of fluid in said brake pipe and a chamber and operative upon a reduction in pressure in said brake pipe below that in said chamber to a brake application position for effecting an application of brakes and operative upon a preponderance in brake pipe pressure over that in said chamber to a brake release position for effecting a release of brakes, electric braking means operative upon energization to brake the locomotive, and means responsive to energization of said electric braking means to release fluid under pressure from said chamber.

2. In a locomotive brake equipment, in combination, a brake pipe, valve means controlled by opposing pressures of fluid in said brake pipe and a chamber and operative upon a reduction in pressure in said brake pipe below that in said chamber to a brake application position for effecting an application of brakes and operative upon a preponderance in brake pipe pressure over that in said chamber to a brake release position for effecting a release of brakes, electric braking means operative upon energization to brake the locomotive, means responsive to energization of said electric braking means to reduce the pressure of fluid in said pressure chamber, and means for limiting the reduction thus effected in said pressure chamber to a pressure at least as low as that in said brake pipe.

3. In a locomotive brake equipment, in combination, a brake pipe, valve means controlled by opposing pressures of fluid in said brake pipe and a chamber and operative upon a reduction in pressure in said brake pipe below that in said chamber to a brake application position for effecting an application of brakes and operative upon a preponderance in brake pipe pressure over that in said chamber to a brake release position for effecting a release of brakes, electric braking means operative upon energization to brake the locomotive, and means responsive to energization of said electric braking means to establish a one-way flow communication from said chamber to said brake pipe.

4. In a locomotive brake equipment, in combination, a brake pipe, valve means controlled by opposing pressures of fluid in said brake pipe and a chamber and operative upon a reduction in pressure in said brake pipe below that in said chamber to a brake application position for effecting an application of brakes and operative upon a preponderance in brake pipe pressure over that in said chamber to a brake release position for effecting a release of brakes, electric braking means operative upon energization to brake the locomotive, a reservoir, and means responsive to deenergization of said electric braking means to vent said reservoir and to energization of said electric braking means to close the vent to said reservoir and open said pressure chamber to said reservoir.

5. In a locomotive brake equipment, in combination, a brake pipe, valve means controlled by opposing pressures of fluid in said brake pipe and a chamber and operative upon a reduction in pressure in said brake pipe below that in said chamber to a brake application position for effecting an application of brakes and operative upon a preponderance in brake pipe pressure over that in said chamber to a brake release position for effecting a release of brakes, electric braking means operative upon energization to brake the locomotive, a reservoir, valve means responsive to energization of said electric braking means to open said reservoir to said chamber and to open a communication from said pressure chamber to said brake pipe and responsive to deenergization of said electric braking means to disconnect said reservoir from said chamber and vent said reservoir and to also close said communication, and means for preventing flow of fluid under pressure through said communication in the direction from said brake pipe to said chamber but for permitting flow of fluid under pressure in the opposite direction.

6. In a locomotive brake equipment, in combination, a brake pipe, valve means controlled by opposing pressure of fluid in said brake pipe and a chamber and operative upon a reduction in pressure in said brake pipe below that in said chamber to a brake application position for effecting an application of brakes and operative upon a preponderance in brake pipe pressure over that in said chamber to a brake release position for effecting a release of brakes, electric braking means operative upon energization to brake the locomotive, a discharge valve, a movable abutment subject on one side to pressure in said brake pipe and on the opposite side to an opposing pressure including pressure of fluid in a second chamber and operative in response to a preponderance of said opposing pressure to open said discharge valve for venting fluid under pressure from said second chamber and in response to a preponderance of brake pipe pressure to close said discharge valve, and means responsive to energization of said electric braking means to open the first named chamber to said second chamber and responsive to deenergization of said electric braking means to close communication between said chambers.

7. In a locomotive brake equipment, in combination, a brake pipe, valve means controlled by opposing pressures of fluid in said brake pipe and a chamber and operative upon a reduction in brake pipe pressure below that in said chamber to a brake application position for effecting an application of brakes and operative upon a certain preponderance in brake pipe pressure over that in said chamber to a position for supplying fluid under pressure from said brake pipe to said chamber at a chosen rate and operative upon a greater preponderance in brake pipe pressure over that in said chamber to another position for supplying fluid under pressure from said brake pipe to said chamber at a rate slower than said chosen rate and operative in both of the two last named positions to effect a release of brakes, electric braking means operative upon energization to brake the locomotive, and means operative upon energization of said electric brake means to establish said greater preponderance of brake pipe pressure over the pressure of fluid in said chamber.

8. In a locomotive brake equipment, in combination, a brake pipe, valve means controlled by opposing pressures of fluid in said brake pipe and a chamber and operative upon a reduction in brake pipe pressure below that in said chamber to a brake application position for effecting an application of brakes and operative upon a certain preponderance in brake pipe pressure over that in said chamber to a position for supplying fluid under pressure from said brake pipe to said chamber at a chosen rate and operative upon a greater preponderance in brake pipe pressure over that in said chamber to another position for supplying fluid under pressure from said brake pipe to said chamber at a rate slower than said chosen rate and operative in both of the two last named positions to effect a release of brakes, equalizing discharge valve means including means arranged to respond to a reduction in pressure in said brake pipe to open said discharge valve for venting fluid under pressure from said chamber and for closing said discharge valve upon establishing said preponderance in brake pipe pressure over that in said chamber, electric braking means operative upon energization to brake the locomotive, and means responsive to energization of said electric braking means to render said equalizing discharge valve means effective to reduce pressure of fluid in said chamber and responsive to deenergization to prevent operation of said equalizing discharge valve means to reduce pressure of fluid in said chamber.

9. In a locomotive brake equipment, in combination, a brake pipe, an independent application pipe, an engineer's automatic brake valve device having one position for charging said brake pipe, a second position for reducing pressure of fluid in said brake pipe and also having a lap position and comprising a passageway and means for opening said passageway to atmosphere in said one position and for closing communication between said passageway and atmosphere in said second and lap positions, an engineer's independent brake valve device for opening and closing communication between said independent application pipe and said passageway, brake applying means operable by fluid under pressure to apply the locomotive brakes, electric means operative upon energization to brake the locomotive, a pipe connected at one end to said passageway, and means responsive to energization of said electric means to vent the other end of said pipe and to open said brake applying means to said independent application pipe.

10. In a locomotive brake equipment, in combination, a brake pipe, an independent application pipe, application means operative by fluid under pressure to effect an application of brakes and upon release of fluid under pressure a release of brakes, equalizing means operative by a preponderance in pressure of fluid in a chamber over that in said brake pipe to supply fluid under pressure to said application means and operative by a preponderance in brake pipe pressure over that in said chamber to establish a communication from said application means to said independent application pipe, an engineer's automatic brake valve device having a brake release position for supplying fluid under pressure to said brake pipe and for opening said independent application pipe to atmosphere and having a service position for venting fluid under pressure from said brake pipe and also having a lap position and being operative in both said service and lap position to close communication between said independent application pipe and atmosphere, electric braking means operative upon energization to brake said locomotive, and means responsive to energization of said electric braking means to release fluid under pressure from said chamber and also to open said independent application pipe to atmosphere and responsive to deenergization of said electric braking means to terminate such release of fluid under pressure from said chamber and also to close the connection between said independent application pipe and atmosphere.

11. In a locomotive brake equipment, in combination, a brake pipe, an independent application pipe, application means operative by fluid under pressure to effect an application of brakes and upon release of fluid under pressure a release of brakes, equalizing means operative by a preponderance in pressure of fluid in a chamber over that in said brake pipe to supply fluid under pressure to said application means and operative by a preponderance in brake pipe pressure over that in said chamber to establish a communication from said application means to said independent application pipe, an engineer's automatic brake valve device having a brake release position for supplying fluid under pressure to said brake pipe and for opening said independent application pipe to atmosphere and having a service position for venting fluid under pressure from said brake pipe and also having a lap position and being operative in both said service and lap position to close communication between said independent application pipe and atmosphere, an engineer's independent brake valve device controlling communication between said independent application pipe and said automatic brake valve device and having a brake release position for opening such communication and a brake application position for closing such communication, a pipe connected to the said communication between said independent and automatic brake valve devices, electric braking means operative upon energization to brake said locomotive, and means responsive to energization of said electric braking means to open a communication for releasing fluid under pressure from said chamber, to establish said preponderance in brake pipe pressure over that in said chamber and also open the last named pipe to atmosphere and responsive to deenergization of said electric braking means to close the last named communication and also to close communication between the last named pipe and atmosphere.

12. In a locomotive brake equipment, in combination, a brake pipe, an independent application pipe, brake cylinder means operative by fluid under pressure to effect an application of brakes and upon release of fluid under pressure to effect a release of brakes, a distributing valve device comprising an application portion operative upon supply and release of fluid under pressure, respectively, to correspondingly vary pressure of fluid in said brake cylinder means, and an equalizing portion operative upon a reduction in pressure in said brake pipe below that in a chamber to supply fluid under pressure to said application portion and operative upon a preponderance in brake pipe pressure over that in said chamber to open said application means to said independent application pipe, a restricted communication opening said brake cylinder means to said independent application pipe, an engineer's brake valve device having a brake release position for opening said independent application pipe to atmosphere and having another position for reducing pressure of fluid in said brake pipe and closing communication between said independent application pipe and atmosphere, electric braking means operative upon energization to brake the locomotive, and means responsive to energization of said electric braking means to establish said preponderance in brake pipe pressure over that in said chamber and to also open a vent from said independent application pipe.

13. In a locomotive brake equipment, in combination, a brake pipe, an independent application pipe, a distributing valve device comprising an application portion operative upon supply and release of fluid under pressure to and from a chamber to, respectively, effect application and release of locomotive brakes, and an equalizing portion operative upon a reduction in brake pipe pressure to supply fluid under pressure to said chamber and upon an increase in pressure in said brake pipe to open said chamber to said independent application pipe, an engineer's brake valve device having one position for supplying fluid under pressure to said brake pipe and for opening said independent application pipe to atmosphere and having service and emergency positions for venting fluid under pressure from said brake pipe and closing communication between said independent application pipe and atmosphere, valve means controlling communication through said independent application pipe between said distributing valve device and brake valve device operative only upon an emergency reduction in brake pipe pressure to close such communication and to open a fluid pressure supply communication to said independent application pipe, and a communication by-passing said equalizing portion providing for flow of fluid under pressure only in the direction from said independent application pipe to said chamber.

14. In a locomotive brake equipment, in combination, a brake pipe, an independent application pipe, a distributing valve device comprising an application portion operative upon supply and release of fluid under pressure to and from a chamber to, respectively, effect application and release of locomotive brakes, and an equalizing portion operative upon a reduction in brake pipe pressure to supply fluid under pressure to said chamber and upon an increase in pressure in said brake pipe to open said chamber to said independent application pipe, an engineer's brake valve device having one position for supplying fluid under pressure to said brake pipe and for opening said independent application pipe to atmosphere and having service and emergency positions for venting fluid under pressure from said brake pipe and closing communication between said independent application pipe and atmosphere, a source of fluid under pressure, a volume, means providing a constantly open restricted communication from said source to said volume, valve means operative by fluid from said brake pipe, when in excess of a chosen degree, to open communication through said independent application pipe from said distributing valve device to said brake valve device and operative when at a lower degree to close the last named communication and to open said volume to the portion of said independent application pipe connected to said equalizing portion, and a communication by-passing said equalizing portion providing for flow of fluid under pressure only in the direction from said independent application pipe to said chamber.

15. In a locomotive brake equipment, in combination, a brake pipe, an independent application pipe, a distributing valve device comprising an application portion operative in response to supply and release of fluid under pressure to a chamber, respectively, to apply and release the locomotive brakes, an equalizing portion operative upon a reduction in brake pipe pressure to supply fluid under pressure from a pressure chamber to said application portion and upon a preponderance in brake pipe pressure over that in said pressure chamber to open said application portion chamber to said independent application pipe, an engineer's brake valve device having one position for supplying fluid under pressure to said brake pipe and for opening said independent application pipe to atmosphere and having a service position for effecting a service reduction in brake pipe pressure and an emergency position for effecting an emergency reduction in pressure in said brake pipe and operative in all positions except said one position to close the connection between said independent application pipe and atmosphere, electric braking means operative upon energization to brake the locomotive, means responsive to energization of said electric braking means to release fluid under pressure from said pressure chamber for establishing said preponderance in brake pipe pressure over that in said pressure chamber and to open said independent application pipe to atmosphere and responsive to deenergization of said electric braking means to close the fluid pressure release communication from said pressure chamber and the connection between said independent application pipe and atmosphere, a switch for effecting deenergization of said electric braking means, means responsive to an emergency reduction in brake pipe pressure to open said switch and establish a fluid pressure supply communication to said independent application pipe, and a one-way flow communication providing for flow of fluid under pressure from said independent application pipe to said application portion.

16. In a locomotive brake equipment, in combination, a brake pipe, an independent application pipe, a safety valve device, a distributing valve device comprising an application portion operative in response to supply and release of fluid under pressure to and from a control chamber to apply and release the locomotive brakes, a pressure chamber, an equalizing portion responsive to a preponderance in brake pipe pressure over that in said pressure chamber to open said control chamber to said independent application pipe and said pressure chamber to said brake pipe and responsive to either a service or an emergency reduction in brake pipe pressure for opening said pressure chamber to said control chamber and to close communication between said control chamber and independent application pipe and also operative upon an emergency reduction in brake pipe pressure to open said control chamber to said safety valve device, an engineer's automatic brake valve device having a brake release position for opening said independent application pipe to atmosphere and for supplying fluid under pressure to said brake pipe and having service and emergency positions for effecting, respectively, service and emergency rates of reduction in pressure in said brake pipe, and a lap position for closing off supply of fluid under pressure to and release of fluid under pressure from said brake pipe and being also operative in the service, emergency and lap positions to close communication between said independent release pipe and atmosphere, an engineer's independent brake valve device controlling communication between said independent application pipe and said automatic brake valve device and having a running position for opening such communication and an application position for closing such communication and for supplying fluid under pressure to the portion of said independent application pipe connected to said distributing valve device, an interlock valve controlling communication through said independent application pipe from said distributing valve device to said independent brake valve device and operative by brake pipe pressure when in excess of a chosen degree to open such communication and when at a lower degree to close such communication and supply fluid under pressure to the portion of said independent application pipe leading to said distributing valve device, and a one-way-flow communication connecting said independent application pipe to said control chamber in by-passing relation to said equalizing portion to provide for flow of fluid under pressure only in the direction to said control chamber.

17. In a locomotive brake equipment, in combination, a brake pipe, an independent application pipe, a safety valve device, a distributing valve device comprising an application portion operative in response to supply and release of fluid under pressure to and from a control chamber to apply and release the locomotive brakes, a pressure chamber, an equalizing portion responsive to a preponderance in brake pipe pressure over that in said pressure chamber to open said control chamber to said independent application pipe and said pressure chamber to said brake pipe and responsive to either a service or an emergency reduction in brake pipe pressure for opening said pressure chamber to said control chamber and to close communication between said control chamber and independent application pipe and also operative upon an emergency reduction in brake pipe pressure to open said control chamber to said safety valve device, an engineer's automatic brake valve device having a brake release position for opening said independent application pipe to atmosphere and for supplying fluid under pressure to said brake pipe and having service and emergency positions for effecting, respectively, service and emergency rates of reduction in pressure in said brake pipe, and a lap position for closing off supply of fluid under pressure to and release of fluid under pressure from said brake pipe and being also operative in the service, emergency and lap positions to close communication between said independent release pipe and atmosphere, an engineer's independent brake valve device controlling communication between said independent application pipe and said automatic brake valve device and having a running position for opening such communication and an application position for closing such communication and for supplying fluid under pressure to the portion of said independent application pipe connected to said distributing valve device, an interlock valve controlling communication through said independent application pipe from said distributing valve device to said independent brake valve device and operative by brake pipe pressure when in excess of a chosen degree to open such communication and when at a lower degree to close such communication and supply fluid under pressure to the portion of said independent application pipe leading to said distributing valve device, a one-way-flow communication connecting said independent application pipe to said control chamber in by-passing relation to said equalizing portion to provide for flow of fluid under pressure only in the direction to said control chamber, electric braking means operative upon energization to brake the locomotive, means responsive to energization of said electric braking means to reduce the pressure in said pressure chamber below that in said brake pipe for moving said equalizing portion to its release position and for also opening to atmosphere the portion of said independent application pipe extending between the engineer's automatic and independent brake valve device, and operative upon deenergization of said electric means to close the vent from said pressure chamber and the respective atmospheric connection of said independent application pipe, and a switch for effecting deenergization of said electric means, said interlock valve comprising means operative upon operation thereof in response to said lower degree of brake pipe pressure to effect operation of said switch to deenergize said electric means.

18. In a locomotive brake equipment, in combination, a brake pipe, a distributing valve device comprising an application portion operable in response to supply and release of fluid under pressure to apply and release, respectively, locomotive brakes, an equalizing portion operative upon a reduction in pressure in said brake pipe to supply fluid under pressure from a pressure chamber to said application portion and operative upon a preponderance in pressure in said brake pipe over that in said chamber to cut off supply of fluid under pressure to said application portion, and a release portion operable by fluid under pressure to release fluid under pressure from said application portion, electric means operative upon energization to brake the locomotive, and means responsive to energization of said electric means to effect said preponderance in pressure and to supply fluid under pressure to said release portion, and means for limiting the time which said release portion is operated by such fluid pressure.

19. In a locomotive brake equipment, in combination, a brake pipe, a distributing valve device comprising an application portion operable in response to supply and release of fluid under pressure to apply and release, respectively, locomotive brakes, an equalizing portion operative upon a reduction in pressure in said brake pipe to supply fluid under pressure from a pressure chamber to said application portion and operative upon a preponderance in pressure in said brake pipe over that in said chamber to cut off supply of fluid under pressure to said application portion, and a release portion operable by fluid under pressure to release fluid under pressure from said application portion, electric means operative upon energization to brake the locomotive, a reservoir, relay means arranged to be operated by fluid under pressure from said reservoir to supply fluid under pressure to operate said release portion, means for gradually releasing the actuating fluid under pressure from said relay means and reservoir, means for operating said relay means to release actuating fluid under pressure from said release portion upon a reduction in pressure of such fluid to a chosen degree, and means operative upon deenergization of said electric means to charge said reservoir with fluid under pressure and upon energization of said electric means to connect said reservoir to said relay means and to also vent fluid under pressure from said pressure chamber to establish said preponderance in brake pipe pressure.

20. In a locomotive brake equipment, the combination with a brake pipe, an independent application pipe, a distributing valve device comprising an application portion responsive to supply and release of fluid under pressure to apply and release, respectively, brakes on the locomotive, an equalizing portion responsive to a reduction in pressure in said brake pipe below that in a pressure chamber to supply fluid under pressure from said chamber to said application portion and operative by a preponderance in pressure in said brake pipe over that in said pressure chamber to open said application portion to said independent application pipe, a communication by-passing said equalizing portion connecting said independent application pipe to said application portion, a check valve for closing said communication against flow of fluid under presure in the direction toward said independent application pipe, a release piston operable by fluid under pressure to unseat said check valve, another valve controlling communication between said independent application pipe and atmosphere and opened by operation of said release piston by fluid under pressure, electric means operative upon energization to brake the locomotive, and means responsive to energization of said electric means to establish said preponderance in brake pipe pressure and to supply fluid under pressure to said release piston to operate same.

21. In a locomotive brake equipment, the combination with a brake pipe, an independent application pipe, a distributing valve device comprising an application portion responsive to supply and release of fluid under pressure to apply and release, respectively, brakes on the locomotive, an equalizing portion responsive to a reduction in pressure in said brake pipe below that in a pressure chamber to supply fluid under pressure from said chamber to said application portion and operative by a preponderance in pressure in said brake pipe over that in said pressure chamber to open said application portion to said independent application pipe, a communication by-passing said equalizing portion connecting said independent application pipe to said application portion, a check valve for closing said communication against flow of fluid under pressure in the direction toward said independent application pipe, a release piston operable by fluid under pressure to unseat said check valve, another valve controlling communication between said independent application pipe and atmosphere and opened by operation of said release piston by fluid under pressure, an independent release pipe, an engineer's independent brake valve device having one position for venting said independent release pipe and another position for supplying fluid under pressure thereto, electric means operative upon energization to brake the locomotive, and means responsive to energization of said electric means to establish said preponderance in brake pipe pressure, to close communication between said independent release pipe and said release piston and to supply fluid under pressure to said release piston to operate same and operative upon deenergization to open said release piston to said independent release pipe.

References Cited in the file of this patent

UNITED STATES PATENTS

| Number | Name | Date |
|---|---|---|
| 1,439,467 | Farmer | Dec. 19, 1922 |
| 1,442,305 | Steams et al. | Jan. 16, 1923 |
| 2,445,680 | Linhart | July 20, 1948 |